March 26, 1929. W. F. RAAB 1,707,139
CIRCUIT CLOSER FOR AUTOMOBILE SIGNALING DEVICES
Filed Feb. 5, 1925
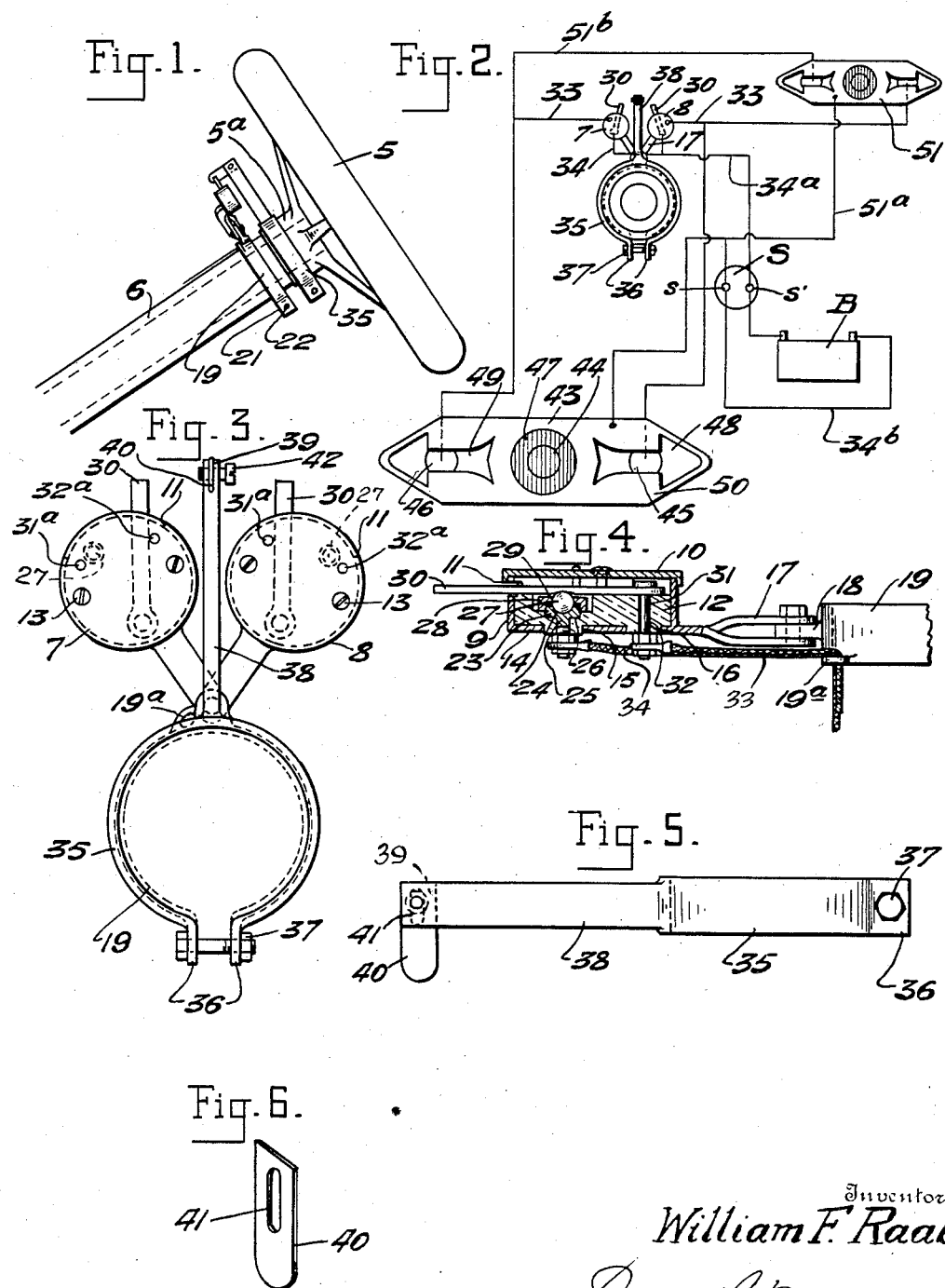

Patented Mar. 26, 1929.

1,707,139

UNITED STATES PATENT OFFICE.

WILLIAM F. RAAB, OF NEW YORK, N. Y.

CIRCUIT CLOSER FOR AUTOMOBILE SIGNALING DEVICES.

Application filed February 5, 1925. Serial No. 7,004.

This invention relates to automobile signaling devices, and the primary object of the same is to automatically illuminate a signaling means at the rear of an automobile by actuation of the steering wheel to positively indicate to a driver of another machine in rear of the automobile equipped with the improved signaling device the intention to turn to the right or left during travel of the machine in a straight direction.

A further object of the invention is to provide an improved automobile signaling device of a novel and automatic character which may be readily applied to automobiles now in use or during factory construction thereof, and also applicable to steering wheels and columns of different sizes and designs with the same effectiveness in operation.

The present invention is an improvement on that disclosed by my pending application Serial No. 710,602, filed May 2, 1924, and the most essential object of the present improvement is to reduce the number of parts relatively to the device embodied in my aforesaid pending application.

With the foregoing and other objects and advantages in view, the invention consists in the preferred construction and arrangement of the several parts which will be more fully hereinafter described and claimed.

In the drawing:

Fig. 1 is a side elevation of a steering wheel of an automobile and a portion of the post or column with which the said wheel is associated, showing the improved signal-controlling means applied thereto.

Fig. 2 is a top plan view of the steering post, the steering wheel being detached therefrom and having the improved signal-controlling means applied thereto, said view also showing in diagram the electric circuits, battery, switch means and rear signal device, which in the present instance comprises oppositely projecting arrows and a central tail-light adapted to be illuminated.

Fig. 3 is a top plan view on an enlarged scale of the main features of the improved signaling means, parts thereof being shown in dotted lines.

Fig. 4 is a transverse vertical section through one of the switch elements of the improved signal means and showing in side elevation a part of the attaching means.

Figs. 5 and 6 are detail views of parts of the improved signal means.

Attached to the steering post or column 6 of an automobile or similar vehicle are two primary switch sections or members generally designated by 7 and 8. Each section or member comprises a metallic cup or casing 9, which is open at the top and closed by a flanged cover or cap 10, a slot 11 being formed between the said cover or cap and the cup or casing. Within each cup or casing is a block or disk 12 of suitable insulating material, which is secured in place by fastenings 13, and openings 15 and 16 are formed through the bottom 14 of each cup or casing. Also extending from the bottom 14 of each cup or casing is an attaching arm 17, the two arms being so shaped as to embrace the upper and lower portions of a lug or projection 18 of an adjustable clamping band 19, which is applied to the steering column 6, as shown by Fig. 1, the inner extremities of the arm 17 being held in connection with the lug or projection 18 by a suitable clamping bolt and nut. The clamping band 19, as clearly shown by Fig. 1, has projected extremities 21 through which extends a clamping bolt 22, and when the band 19 is applied to the column or post 6, it may be securely fixed against accidental movement by tightening the said clamping bolt 22, thus setting up a tight frictional engagement of the said band with the column or post. Within the cup or casing 9 of each section or member and located within the insulating block or disk 12 is an electrical contact, generally designated by 23, and comprising a cup 24 having a depending shank 25 seated in a suitable opening 26 in the insulation, the shank 25 projecting through the opening 15 of the cup or casing. In the cup 24 an anti-frictional ball 27 is mounted and held in place by an annular keeper 28, which has a central opening 29 through which a portion of the ball is exposed for contact with a switch lever 30, pivotally held by a pin 31, also extending through an opening 32 in the insulating block or disk 12 and through the opening 16 in the bottom 14 of the cup or casing 9. The switch lever 30 extends through the slot 11 and is of such length as to be readily engaged for operation by means which will be hereinafter more fully explained. The movement of the switch lever 30 is limited in opposite directions by upwardly projecting stops 31ª and 32ª, also secured in the insulating block or disk 12 and held at their upper extremities by the cover or cap 10. This cover or cap 10 is fixed in place by suitable fastenings, which may be the fastenings 13 or other independent similar fastening devices. To the shank 25 and the lower terminal of the pin 31 of each member or section 7 and 8 electrical conducting wires 33 and 34 are respectively connected and form a part of an electrical signaling circuit, which will also be hereinafter more fully explained.

Secured on the hub 5ª of the steering wheel 5 is a clamping band 35, in all respects similar to the clamping band 19 and shown in plan view by Fig. 3. This clamping band 35 has outwardly projecting terminals 36 engaged by a clamping bolt and nut 37 for securely holding the said band in frictional engagement with the hub 5ª. Projecting outwardly from the band at a point opposite the clamping bolt and nut 37 is an arm 38 formed with a slot 39 in which is mounted a resilient contact 40. This contact depends a suitable distance and is provided with a vertical slot 41 in the upper portion thereof, whereby the said contact may be longitudinally adjusted to vary the dependence thereof from the free end of the arm 38. The yielding contact 40, which acts as a wiper, is adjustably held in the slot 39 of the arm 38 by a clamping screw or analogous device 42 which extends transversely through the slotted end of the arm 38 and through the slot 41 of the contact 40, the said screw being positively tightened after the adjustment of this contact has been made. The length of the arm 38 and the dependence of the yielding contact 40 are such that the said contact may engage the free extremities of the switch levers 30 of the switch sections or members 7 and 8, and the latter sections or members will be primarily adjusted or positioned so that the contact 40 will engage and rock the said levers so as to bring them into engagement with and throw them off or over from the contact balls 27 in accordance with the rotation of the steering wheel 5 in opposite directions in turning to either the right or left and thus close and open the electric circuits through said levers and balls.

The insulating block or disk 12 in each switch section or member will be of a suitable character but preferably of phenol condensation product, although insulating fibrous material may be used if desired.

The extremities or terminals of the shanks 25 and pins 31 which project through the casings are formed as binding posts for the wires or electrical conductors 33 and 34, respectively, of the signaling circuit. The said circuit also includes a battery B, a switch S and the signaling box or enclosure 43, in all respects similar to that disclosed in my pending application hereinbefore noted and formed of metal with a central tail-light 44 and opposite end lights 45 and 46. The central light 44 is disposed to illuminate a central circular lens 47 and the lights 45 and 46 have arrow-shaped transparent plates or lenses 48 and 49 in reverse positions in illuminating association therewith, all of the lenses being carried by the side 50 of the box or signaling enclosure 43 which is exposed to view. The wire 33 from the shank 25 of the one switch section or member is connected to the light 46 and the wire 33 from the shank 25 of the other switch section or member is connected to the opposite light 45. The wires 34 from the pins or posts 31 of the switch levers 30 are jointly connected by a wire 34ª to one side of the battery B, the opposite side of said battery being connected by a wire 34ᵇ to the metallic casing of the signaling enclosure 43. The switch S which may be the motor switch, has the points s and s' disposed in opposite relation and adapted to be engaged by a suitable switch lever, not shown, so that the signaling means may be placed in circuit or disconnected as desired. It will be understood that when the switches are open the electric circuit will be broken and the lights 45 and 46 as well as the tail-light 44 will remain extinguished, as for instance during daylight. At night the switch S will be closed and the battery B thrown into circuit so as to effect an illumination of the lamps 44, 45 and 46. The switch S will be located on the instrument board of the machine, or elsewhere, within easy reaching distance of the driver or operator. It is proposed to use any suitable structure in the casing or enclosure 43 to divide the several lights 44, 45 and 46, and this division may be similar to the divisional structure disclosed by my aforesaid pending application.

The operation of the improved signaling device is very simple, and when the steering wheel 5 is turned in opposite directions, either one or the other of the switch levers 30 will be engaged by the depending yielding contact or wiper 40 and rocked to engage either one of the contact balls 27, the operated switch lever 30 being held against movement beyond a predetermined distance by the stop 32ª and permitting the yielding contact or wiper 40 to pass over the projecting end of the switch lever 30 engaged, so that when the steering wheel is brought into normal position to guide the machine or automobile in a straight direction, the said yielding contact or wiper 40 will again engage and rock the switch lever in the opposite direction to restore it to normal position, that is to say, to move it out of engagement with the contact ball with which it may have been in contact. This operation ensues regularly with regard to both switch levers 30, and by this means the direction of movement of an automobile or machine equipped with the improved signaling means may be very clearly indicated, particularly with relation to the drivers of machines in rear thereof, with material advantage in steering operations.

The instrument board of the machine will also be provided with an indicator 51, corresponding in construction to, but of smaller dimensions than, the rear signaling device comprising the enclosure 43, to inform a driver or operator whether or not the lights in rear of the car are working at all times.

This indicator will be connected by wires 51ᵃ and 51ᵇ, respectively, to the casing or enclosure 43 of the rear signaling device and to the wire 33 of the switch section or member 7, the similar wire 33 from the opposite section or member 8 being also connected to the indicator. The wire 51ᵃ is attached to one side of the battery B by connection with the wire 34ᵇ, as clearly shown by Fig. 2. It will be seen that the wires 51ᵇ forming continuations of the wire 33 from the switch sections or members 7 and 8 are connected to the lamps in the indicator 51, the said indicator having the same arrangement of lamps and tail light as the rear larger signaling device. The clamping band 19 is also provided with a ring or eye 19ᵃ, through which the wires 34 and 34ᵃ are passed to bring the said wires in close relation to the post or column 6, to thereby prevent the wires from becoming loose relatively to the post or column.

It will be understood that changes in the proportions and minor details of construction may be adopted without in the least departing from the spirit or features of the invention.

What is claimed as new is:

A single controlling switch means applicable to the steering wheel and column of an automobile, comprising a clamp for attachment to the steering column of an automobile, opposing independently operable switch devices carried by and divergently projecting from said clamp, each of said switch devices comprising separated outer contact and inner stop means insulated one from another and an outwardly projecting lever, the levers of the switch devices being independently and alternately operable to engage and disengage the contact and stop devices, and a single switch operating means adapted to be secured to and to extend radially of the axis of rotation of the steering wheel and being normally free of the levers, said operating means having a depending adjustable spring device arranged at right angles to the switch levers and adapted, when said steering wheel is turned in either direction, to first engage and move one of the said levers into engagement with its associated contact and then pass over the lever and thereby close such switch in accordance with the direction in which the steering wheel is turned and, when the steering wheel is turned in the opposite direction, to first reset the switch lever in open position and then pass back over said lever, the depending spring device of the switch operating means being resilient enough to easily pass over each lever extremity without interfering with the operation of the steering wheel.

In testimony whereof I have hereunto set my hand.

WILLIAM F. RAAB.